Sept. 22, 1964 J. A. CHILMAN ETAL 3,149,678
WIND MOTORS
Filed Feb. 28, 1964 2 Sheets-Sheet 2

INVENTORS
JOHN A. CHILMAN &
ROBERT T. ELMES
By Reynolds & Christensen
ATTORNEYS 3,149,678
WIND MOTORS
John A. Chilman, Painswick, and Robert T. Elmes, Birdlip, England, assignors to Dowty Rotol Limited, Gloucester, England, a British company
Filed Feb. 28, 1964, Ser. No. 348,152
Claims priority, application Great Britain Mar. 18, 1963
8 Claims. (Cl. 170—76)

This invention relates to wind motors of the kind having a bladed rotor and suitable for use in vehicles such as aircraft for driving accessories, for example, hydraulic pumps, the wind motor being movable from a stowed inoperable position within the vehicle to an extended operable position externally of the vehicle and in the slipstream thereof, and being retractable from the extended position into the stowed position when its operation is no longer required. Such a wind motor is hereinafter referred to as "a wind motor of the kind described."

According to the invention, a wind motor of the kind described includes means operable at least to retard rotation of its rotor prior to retraction, and positioning means operable in conjunction with the retarding means to ensure that the rotor is stopped in a predetermined rotational position so that the wind motor presents its overall smallest cross-sectional area to an opening in the wall of the vehicle for retraction of the wind motor through that opening.

In this way only an opening which is of smaller area than was the case hitherto, where rotation of the rotor was not arrested in a predetermined position prior to retraction, is required.

An interlock may be provided between the means for retracting the wind motor and the positioning means as a safety feature to ensure that retraction of the motor may not be effected until rotation of the rotor has been stopped and the rotor is in its predetermined position.

The blades of the wind motor may be adjustable automatically as to pitch, and in this case further means may be provided, operative with stopping of the rotor prior to retraction, to ensure movement of the blades to the substantially feathered position.

The blades may be so adjustable as to pitch by hydraulic governor controlled means, so that when the wind motor is operative the governor acts to maintain the rotor at a substantially constant rotational speed.

When the wind motor is no longer required to operate, the governor is automatically effective to cause the blade pitch to be adjusted so that the rotor slows down, being finally stopped by the positioning means.

The wind motor may be arranged so as to be connected to drive an emergency hydraulic pump which is supplementary to supply pumps provided in the vehicle or the like in which the wind motor is intended to be installed. When use of the emergency hydraulic pump is necessary (that is upon failure of, or overloading of the supply pumps), a signal is transmitted from the system of which the supply pumps form a part to the wind motor, whereupon a retraction lock is released and the wind motor is automatically extended into the slip-stream. Upon automatic engagement of an extension lock, release of the positioning means is effected and the wind motor becomes operable.

The signal received by the wind motor may be a loss of pressure signal in the hydraulic system. Conveniently, this signal may also be applied to the governor for initiating movement of the blades in the pitch-fining direction.

According to a further feature of the invention, it is arranged that automatically the blades are moved beyond the feathered position into the reverse pitch range prior to commencement of retraction of the wind motor of the turbine rotor by the positioning means occurring upon commencement rotation of the rotor in the reverse direction consequent upon movement of the blades into reverse pitch. In this way engagement of the positioning means occurs at a much lower angular velocity with consequent reduction in inertia loads upon the components of the positioning means.

One embodiment of the invention will now be particularly described by way of example with reference to the accompanying drawings of which—

Figure 1:
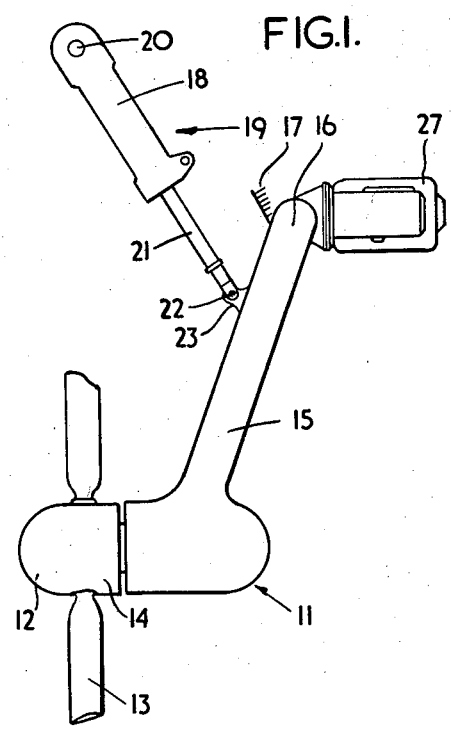
FIGURE 1 shows a wind motor in an extended condition.

As shown in FIGURE 1 of the drawings, a wind motor for use in an aircraft for driving accessories, comprises what is more commonly known as a ram air turbine 11 having a rotor 12 including a pair of blades 13. The blades are of variable pitch, this by virtue of conventional pitch adjusting means (not shown) provided within the hub 14 of the rotor, which means is hydraulically operable.

The fixed part of the wind motor has a leg 15 which is pivotally connected at 16 to a structural part 17 of the aircraft. The cylinder 18 of a retraction jack is pivotally connected at 20 to another part of the aircraft structure, while the piston rod 21 of the retraction jack is pivotally connected at 22 at its end portion remote from the cylinder 18 to a pair of lugs 23 formed upon the leg 15 of the wind motor a short distance away from the pivot connection 16.

Figure 2:
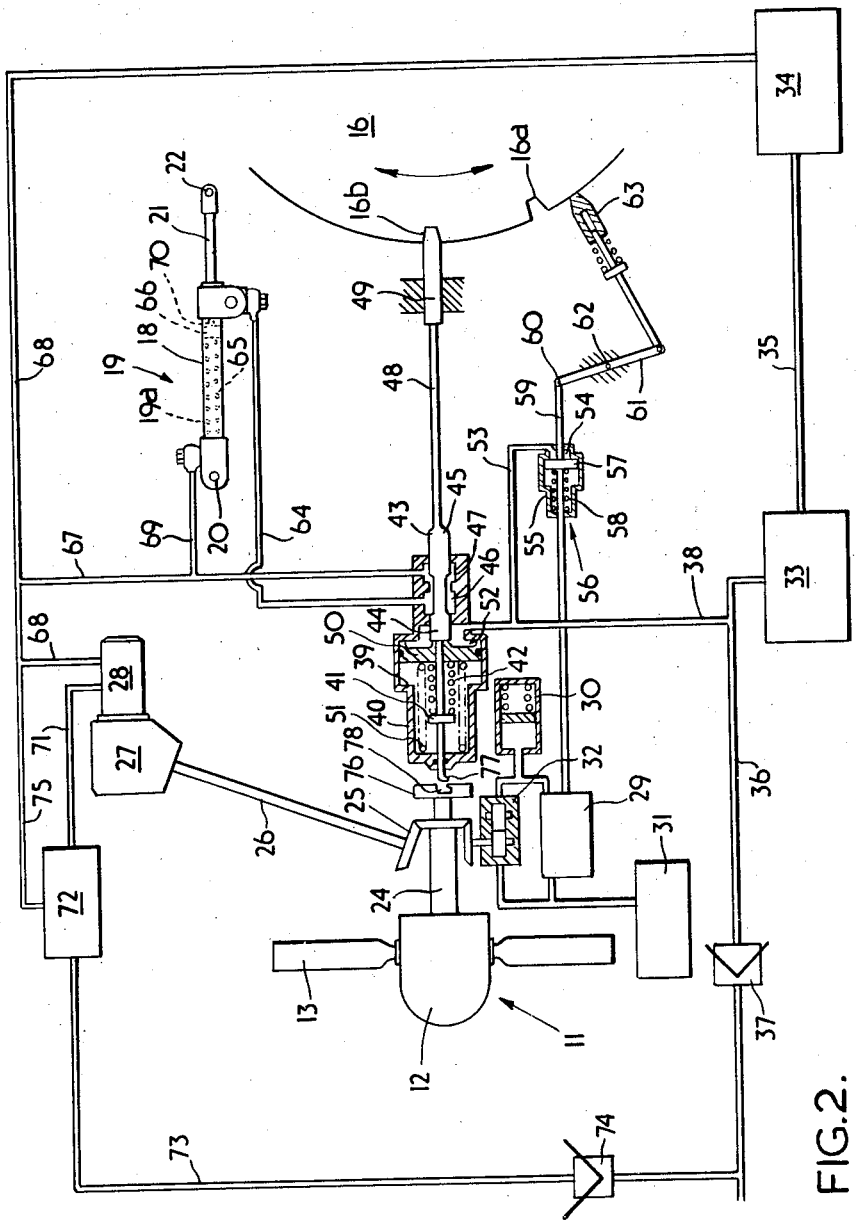
FIGURE 2 shows a control system for the wind motor shown in FIGURE 1.

Referring now to FIGURE 2 of the drawings, the rotor 12 of the ram air turbine is mounted upon a shaft 24 arranged, through a suitable gearing 25 to drive a shaft 26 connected with a gearbox 27. An hydraulic pump 28, together with other accessories (not shown), is mounted upon the gearbox, so as to be driven upon rotation of the ram air turbine.

The hydraulically-operable pitch adjusting means for the blades 13 of the ram air turbine is operable under the control of a governor unit 29 with which is associated an accumulator 30. The governor unit has its own reservoir 31 and pump 32, the latter being drivable through a gearing 25 on the shaft 24. The governor unit is connected by suitable conduits and passageway means (not shown) to the hydraulically-operable pitch-adjusting means within the hub 14.

The main hydraulic system of the aircraft includes main pumps 33 arranged to be driven by the engines of the aircraft, these pumps drawing hydraulic liquid from a reservoir 34 through a conduit 35 and delivering this liquid to the various services requiring hydraulic operation, through a conduit 36. A non-return valve 37 is provided in the conduit 36, and at a point between this non-return valve and the main pumps 33 a conduit 38 is branched and taken to a lock-operating servo 39. The servo 39 comprises a cylinder 40 having a locking rod 41 supported for axial sliding movement within the cylinder and being biased to the right in the drawing by a coil spring 42. The right-hand end portion of the locking rod 41 takes the form of a spool 43 having two lands 44 and 45 which co-operate with two annuli 46 and 47 surrounding the spool. The right-hand end portion of the spool is connected by a rod 48 to a downlock peg 49 which is engageable with a detent 16b at the pivot connection 16 of the leg 15 of the ram air turbine.

A piston 50 is mounted upon the locking rod 41 and is slidable within the cylinder 40. The piston is displaceable with respect to the rod 41, to the left in the drawing, against the effort of a coil spring 51. A chamber 52 formed on the right-hand side of the piston 50 is open to the conduit 38.

A conduit 53 is branched from the conduit 38 and communicates with a chamber 54 formed in the cylinder 55 of a piston-and-cylinder device 56. The piston 57 of this device is displaceable against a spring 58 to the left in the drawing, and has a rod 59, one end portion of which is pivotally connected at 60 to a lever 61, itself pivotally connected at an intermediate point 62 to fixed structure. The end portion of the lever 61 remote from the pivotal connection 60 is connected to a spring-loaded up-lock peg 63 engageable with a detent 16a at the pivot connection 16 of the fixed part of the ram air turbine. The other end portion of the piston rod 59 connects with the displaceable valve element (not shown) of the governor unit 29.

The annulus 46 in the cylinder 40 is connected through a conduit 64 with a chamber 70 formed on the right-hand side in the drawing of the piston 66 of the retraction jack 19. The annulus 47 is connected with a conduit 67 which opens into a main return conduit 68 leading back to the reservoir 34. A conduit 69 places the chamber 65 on the left-hand side of the piston 66 of the retraction jack 19 in communication with the conduit 68.

A coil spring 19a is provided in the jack 19 on the left-hand side of the piston 66, biassing the jack to its extended condition.

The hydraulic pump 28, which can be regarded as an emergency pump, is arranged when in operation to draw liquid from the tank 34 through the conduit 68 and to deliver this through a conduit 71, a flow-sensitive pressure regulator 72, a conduit 73 and a non-return valve 74. The conduit 73 branches into the conduit 36 at a point down-stream of the non-return valve 37. A spill line 75 is taken from the regulator 71 connecting back into the conduit 68.

The shaft 24 upon which the turbine rotor 12 is mounted carries a disc 76 at its end portion remote from the rotor, the disc being rotatable with the rotor and shaft. The end portion 77 of the locking rod 41 remote from the spool 43 is somewhat curved in shape being engageable with a correspondingly-shaped indent 78 formed in that face of the disc 76 remote from the rotor 12. Both the indent and the locking rod, which form stop positioning means for the rotor, are positioned off-centre from the axis of rotation of the rotor. When the end portion 77 is engaged with the detent 78, the rotor 12 is arrested in a predetermined position in which the blades 13 are in alignment with the leg 15 which carries the wind motor.

When the aircraft is operating with the main hydraulic system functioning normally, the pumps 33 being driven by the aircraft engines, pressure liquid is supplied through the conduit 38 into the chamber 52 so that the piston 50 is held displaced to the left against the effort of the coil springs 42 and 51, holding the end portion 77 of the locking rod 41 in engagement with the indent 78 in the disc 76. At the same time the spool 43 is positioned so that the pressure liquid in the conduit 38 communicates through the conduit 64 with the chamber 70 on the right-hand side of the piston 66 of the jack 19 to hold the jack retracted.

If, during operation of the aircraft, due to some failure or overloading of the main engine pumps 33, the pressure in the conduit 38 drops, as does the pressure in the chambers 52 and 54 in consequence, then under the control of the coil spring 58, the piston 57 moves to the right in the cylinder 55 releasing the up-lock peg 63 from the detent 16a. With the loss of pressure condition also in the chamber 70, as soon as release of the up-lock occurs, the spring 19a in the retraction jack 19 is able to extend the jack.

Extension of the ram air turbine is through a slit in the wall of the aircraft. This slit (not shown) conforms closely in profile (with suitable clearance) to the cross-sectional profile of the ram air turbine (transverse of the rotational axis) with its rotor positioned with the blades aligned with the leg 15. During extension, the rotor is still locked by engagement of the end portion 77 with the indent 78 of the disc 76. As soon as extension is complete, the peg 49 engages the indent 16b, and simultaneously, the ram air turbine commences to rotate, this upon release of the curved end portion 77 from the indent 78 with movement of the peg 49 into its down-locked position in the indent 16b.

Upon commencement of rotation of the rotor 12 the blades 13 are in the near-feathered condition. With the piston 57 in its right-hand position in the cylinder 55, the governor unit 29 is free to operate normally to adjust the pitch of the blades in known manner hydraulically so that the turbine soon reaches its on-speed datum condition, with the pump 28 pumping.

When the main engine pumps 33 are no longer overloaded, or when they come back into effective operation to provide pressurisation in the conduit 38, in the chamber 52 and in the chamber 54, such that the pistons 50 and 57 are moved to the left respectively against their coil springs, automatic retraction of the ram air turbine occurs in the following manner.

Displacement of the piston 57 to the left overrides the governor unit 29 in a manner such that the blades 13 are moved into their feathered position. Thus, the ram air turbine slows down (the governor unit and the blades effectively operating as retarding means), the arrangement being such that the blades are caused to move beyond the feathered condition into the reverse pitch range, resulting in the rotor momentarily reversing in its direction of rotation. To ensure this action being completed, the accumulator 30 has sufficient liquid pressure capacity to move the blades 13 just into the reverse pitch range. Simultaneously, the pressure re-applied in the chamber 52 upon the piston 50 and urging the curved end portion 77 on the locking member 41 towards the indent 78 in the disc 76, causes engagement of the portion 77 with the indent. This engagement upon the momentary reverse rotation of the rotor is afforded by the curved shape of the end portion 77, which shape only permits re-entry of the end portion of the locking member upon such reverse rotation.

As this occurs the land 44 of the spool 43 is displaced to place the conduit 38 in communication with the conduit 64. Hence, pressure liquid is applied into the chamber 70 on the right-hand side of the piston 19a of the retraction jack 19. Since the spool 43 has been displaced to the left in the drawing, the peg 49 has also been displaced and lifted from engagement with the indent 16b. Thus the jack 19 is now able to contract.

The engagement of the projection 77 with the indent 78 effects stopping of the turbine rotor 12 in the predetermined position. In this position the rotor is aligned with the leg 15 so that the ram air turbine is retractable through a slit in the wall of the aircraft fuselage and although the profile of the slit closely conforms (with only a small clearance) to the feathered, or near-feathered, profile of the turbine, no fouling occurs. Thus it is only necessary to provide a slit-type opening, as opposed to the much larger conventional type of openings hitherto provided, and this reduces the necessity for structural rearrangement of the wall of the aircraft in the vicinity of the ram air turbine unit and its stowage zone.

The embodiment described therefore provides a means of automatically extending a ram air turbine into the slipstream of an aircraft when pressure conditions in the aircraft hydraulic system make this necessary, and also provides for the automatic retraction of the ram air turbine, through an opening of relatively small area, into the aircraft under conditions when its operation is no longer required.

We claim as our invention:
1. A wind motor designed so as to be suitable for use in vehicles, such as aircraft for driving accessories, for example, hydraulic pumps, and being movable from a stowed inoperable position within the vehicle to an extended operable position externally of and in the slipstream of the vehicle, and being retractable from the extended position to the stowed position, said wind motor comprising in combination:

(a) a body portion, having pivotal mounting means to afford the wind motor its extendability and retractability, (b) means for effecting extension and retraction of the wind motor, (c) a bladed rotor mounted for rotation upon the body portion such rotation occurring when the wind motor is in its extended condition, (d) driving means capable of connecting the bladed rotor to a device to be powered by the bladed rotor, (e) retarding means operable at least to retard rotation of the bladed rotor prior to retraction of the rotor from its extended condition, and, (f) positioning means operable in conjunction with the retarding means to ensure that the bladed rotor is stopped in a predetermined rotational position so that the wind motor presents its overall smallest cross-sectional area to an opening in the wall of the vehicle for retraction of the wind motor through that opening.

2. A wind motor as claimed in claim 1, wherein an interlock is provided between the means for effecting extension and retraction and the positioning means, which interlock is so constructed as to ensure that retraction of the motor may not be effected until rotation of the rotor has been stopped and the rotor is in its predetermined position.

3. A wind motor as claimed in claim 1, wherein the blades thereof are so constructed and so mounted upon the rotor as automatically to be adjustable as to pitch.

4. A wind motor claimed in claim 3, wherein feathering means are provided, so constructed as to be operative with stopping of the rotor prior to retraction to ensure movement of the blades to the substantially feathered position.

5. A wind motor as claimed in claim 3, wherein the blades are automatically adjustable as to their pitch by hydraulic governor-controlled means, so that when the wind motor is operative, the governor acts to maintain the rotor at a substantially constant rotational speed.

6. A wind motor as claimed in claim 3, wherein the blades are controlled by a control system so constructed that just prior to commencement of retraction of the wind motor, the blades automatically are moved beyond the feathered position into the reverse pitch range, locking of the turbine rotor by the positioning means occurring upon commencement of rotation of the rotor in the reverse direction consequent upon movement of the blades into reverse pitch.

7. A wind motor as claimed in claim 1, wherein the device to which the bladed rotor is connectible is an emergency hydraulic pump which is supplementary to supply pumps provided in the vehicle or the like in which the wind motor is intended to be installed.

8. A wind motor as claimed in claim 7, which wind motor is so constructed as automatically to be extendable to its operable position upon failure of, or overloading of, the said supply pumps, a signal, transmitted under these conditions from the system of which the supply pumps form a part to a retraction lock associated with the wind motor, initiating release of the retraction lock and extension of the wind motor.

No references cited.